US009292321B2

(12) United States Patent
Yun

(10) Patent No.: US 9,292,321 B2
(45) Date of Patent: Mar. 22, 2016

(54) SYSTEM, METHOD AND COMPUTER-READABLE RECORDING MEDIUM FOR SYNCHRONOUS SCRIPT LAZY LOADING

(71) Applicant: NAVER BUSINESS PLATFORM Corp., Seongnam-Si, Gyeonggi-Do (KR)

(72) Inventor: Heung Gi Yun, Seongnam-si (KR)

(73) Assignee: Naver Business Platform Corp., Gyeonggi-do (KR)

( * ) Notice: Subject to any disclaimer, the term of this patent is extended or adjusted under 35 U.S.C. 154(b) by 0 days.

(21) Appl. No.: 14/228,826

(22) Filed: Mar. 28, 2014

(65) Prior Publication Data
US 2014/0298308 A1 Oct. 2, 2014

(30) Foreign Application Priority Data

Mar. 28, 2013 (KR) ........................ 10-2013-0033524

(51) Int. Cl.
G06F 9/44 (2006.01)
G06F 9/455 (2006.01)
G06F 9/445 (2006.01)

(52) U.S. Cl.
CPC ........ *G06F 9/45529* (2013.01); *G06F 9/44521* (2013.01); *G06F 9/443* (2013.01)

(58) Field of Classification Search
None
See application file for complete search history.

(56) References Cited

U.S. PATENT DOCUMENTS

| 2002/0023196 | A1 | 2/2002 | Hirai | |
|---|---|---|---|---|
| 2011/0131556 | A1* | 6/2011 | Tatsubori | 717/137 |
| 2011/0283366 | A1 | 11/2011 | Kwon et al. | |
| 2012/0059869 | A1* | 3/2012 | Seo et al. | 709/202 |

FOREIGN PATENT DOCUMENTS

| KR | 20030000926 A | 1/2003 |
|---|---|---|
| KR | 20110117775 A | 10/2011 |
| KR | 20120006288 A | 1/2012 |
| KR | 20120082295 A | 7/2012 |

* cited by examiner

*Primary Examiner* — Qamrun Nahar
(74) *Attorney, Agent, or Firm* — Harness, Dickey & Pierce

(57) ABSTRACT

A synchronous script lazy loader generates a plurality of virtual functions. Each one of the plurality of virtual functions corresponds to one of a plurality of script modules. The plurality of script modules may be associated with a script. The synchronous script lazy loader loads each of the plurality of virtual functions into a storage space. The synchronous script lazy loader loads a desired one of the plurality of script modules into a memory from the storage space. The synchronous script lazy loader executes the desired script module from the memory when a corresponding one of the plurality of virtual functions is requested for initial execution.

20 Claims, 7 Drawing Sheets

```
require(["helper/unit"]. function(util) {
        util.someMethod();
});
``` util.someMethod();

FIG. 6

```
new Function("return definedLazyObject({'sType': 'Class', 'aTiggerMethod':
    ['setData']})";
var TestClass = function0{
    }
TestClass.prototype.setData = function0{}
TestClass.prototype.getData = function0{} new Function("return definedLazyObject({'sType': 'Class', 'aTiggerMethod':
    []})";
var AnotherClass = function0{
    }
AnotherClass.prototype.setData = function0{}
AnotherClass.prototype.getData = function0{}
```

FIG. 7A

| TESTED DEVICE | BEFORE APPLICATION | AFTER APPLICATION | PERCENTAGE OF IMPROVEMENT |
|---|---|---|---|
| DEVICE A(OS I) | 14.44s | 11.30s | IMPROVED BY 21.7% |
| DEVICE B(OS I') | 11.98s | 9.51s | IMPROVED BY 20.6% |
| DEVICE C(OS J) | 6.97s | 5.17s | IMPROVED BY 25.7% |
| DEVICE D(OS J') | 6.57s | 4.94s | IMPROVED BY 24.7% |

FIG. 7B

| TESTED BROWSER | BEFORE APPLICATION | AFTER APPLICATION | PERCENTAGE OF IMPROVEMENT |
|---|---|---|---|
| BROWSER A | 361.17ms | 253.63ms | IMPROVED BY 29.7% |
| BROWSER B | 296.80ms | 198.83ms | IMPROVED BY 34.0% |

SYSTEM, METHOD AND COMPUTER-READABLE RECORDING MEDIUM FOR SYNCHRONOUS SCRIPT LAZY LOADING

RELATED APPLICATIONS

This application claims the benefit of Korean Patent Application No. 10-2013-0033524, filed on Mar. 28, 2013, in the Korean Intellectual Property Office, the disclosure of which is incorporated herein in its entirety by reference.

BACKGROUND

1. Field

Example embodiments relate to a synchronous script lazy loading system, and more particularly, to a system and method of synchronous script lazy loading adapted to separate a script source code into modules for storage and lazily load each module at the time when the module is used so that the modules are synchronously loaded into a memory, and a computer-readable recording medium having recorded thereon a program for executing the synchronous script lazy loading method.

2. Description of the Related Art

Today, the extensive use of the Internet has led to rapid advancements of wireless mobile communication technologies. Use of mobile terminals such as mobile phones, personal digital assistants (PDAs), and hand-held computers allows one to search for information on the Internet with little limitation of time and space. Smart phones collectively refer to mobile phones that combine the functionality of a mobile phone with features of a computer. While retaining the functionality of a mobile phone, smart phones also support additional features such as a PDA function, an Internet function, and a moving image reproduction function. Furthermore, by supporting a wireless Internet function, smart phones may act as a terminal for supporting email, web browsing, fax, banking, and/or game functions. In this way, an increasingly large number of people are web surfing or web browsing by using smart phones that offer various features.

JavaScript is a scripting language developed by Netscape Communications Corp. in the U.S. and is used in various environments. As a representative example, JavaScript is being used as a scripting language that is executed by a web browser such as Internet Explorer developed by Microsoft Corp. In this case, JavaScript may be inserted into a standard hypertext markup language (HTML) document to create an interactive web page. In particular, with the recent improvement in performance of computers and smart phones, JavaScript is being used in a wide range of applications since programs such as animation or simple computations may be implemented by using JavaScript without sending any special request to a server.

However, recently, as more diverse interface features and functions have been added to a web service for user convenience, the size of an associated script file (e.g., JavaScript file) has increased. Fetching, parsing, and loading a script file having such an increased size into a memory for execution results in long loading times for web pages. In particular, due to long loading times, smart phone users experience a significant degradation in performance compared to users of other types of devices because a fast response time is of high importance for smart phones having a small bandwidth. Thus, such a slow response time when using smart phones inconveniences users and results in user dissatisfaction.

In one example, referring to FIG. 1A illustrating a portion of an example HTML file implemented by using a conventional scripting method, a JavaScript file is included in a portion indicated as 'A' by using a <script> tag. A web browser receives an HTML file and sequentially interprets the HTML file by reading a JavaScript file inserted between the <script> tags via a communication network, parsing all JavaScript modules in the JavaScript file, and loading the parsed JavaScript modules into a memory, which is then followed by interpretation of a JavaScript file with a <script> tag in a next line. Thus, the above operations may cause a delay before a web page is displayed on a screen. Furthermore, it is unnecessary to parse all unused JavaScript modules in the HTML file and load them into a memory.

To overcome these problems, one of proposed conventional approaches is to improve execution speed of a web application on a mobile terminal by loading a compiled JavaScript file into a memory so that the compiled JavaScript file is already stored in the memory before running the web application. However, this approach is limited to only a web application in which a script file is repeatedly used after being loaded. It may be difficult to apply the approach uniformly to web surfing in which users browse a plurality of web pages each including different script modules in a single web service through links. Even if this approach is applied, long initial loading times and a waste of memory space due to all script files residing in the memory may result. Furthermore, when a web browser accesses a plurality of web pages provided by a web service, the web browser repeats parsing of script modules in a web page and loading the parsed script modules into a memory even if script files that have previously been read are already stored in a cache and do not need to be read again whenever the web page changes. Thus, to improve performance of the all script modules used in a web service for each web page need to be separated and loaded as needed instead of storing all the script modules in a single file.

Thus, as described above, a lazy loading method has been proposed in which script modules used in a web service are split according to function into a plurality of files and the files are loaded as needed for use. However, a drawback of a conventional lazy loading technique is that many requests may be made at a time according to a script module used in a web page because files are loaded when a specific script module is needed. Another drawback is that the conventional lazy loading technique requires a complicated asynchronous design using a callback function because the conventional lazy loading technique loads script files asynchronously. Furthermore, if a plurality of script modules depend on each other, it is necessary to design a module in consideration of the dependency therebetween. In one example, if a method "someMethod" within an object "util" is used, a code has to be implemented by fetching a module including the object "util" over a network, loading the module, and thereafter using the module in a callback function. The code should be written similar to an example JavaScript code implemented by using a conventional asynchronous JavaScript lazy loading method shown in FIG. 1B.

Asynchronous lazy loading using a callback function requires understanding of asynchronous operations and consideration of the time at which other codes are executed, thereby increasing the complexity of a development process. Furthermore, to apply the asynchronous lazy loading to already existing web pages, previously written source codes have to be modified to a great extent.

Thus, there is a need for a synchronous lazy loading technique that allows loading of each script module into a memory when the script module is needed, thus solving the above-described problems of conventional asynchronous script lazy loading.

SUMMARY

Example embodiments include a system and method of synchronous script lazy loading. In various embodiments, the synchronous script lazy loading is capable of suppressing degradation in loading speed of a web page and a computer-readable recording medium having recorded thereon a program for executing the method.

At least one example embodiment relates to a network element for providing a script for synchronous script lazy loading.

According to one example embodiment, a network element for providing a script for synchronous script lazy loading is provided. The network element includes a script transmitter configured to extract a script from source code based on a request for a web page, and a transceiver configured to provide the script from the script transmitter upon a request for the web page. The script may be used for synchronous script lazy loading. The synchronous script lazy loading includes generating a plurality of virtual functions. Each one of the plurality of virtual functions corresponding to one of a plurality of script modules. The plurality of script modules being associated with a script. The synchronous script lazy loading includes loading each of the plurality of virtual functions into a storage space. The synchronous script lazy loading includes loading a desired one of the plurality of script modules into a memory from the storage space. The synchronous script lazy loading includes executing the desired script module from the memory when a corresponding one of the plurality of virtual functions is requested for initial execution.

Example embodiments provide that the script lazy loading further includes determining whether a version of the desired script module has a same version as the plurality of script modules stored in the storage space.

Example embodiments provide that the script lazy loading further includes receiving a script source code according to a request for the script source code. The script source code may have a same version as a version of at least one of the plurality of script modules currently being used. The synchronous script lazy loading further includes splitting the script source code into the plurality of script modules, and storing the plurality of script modules in the storage space.

Example embodiments provide that the synchronous script lazy loading further includes splitting the script source code into the plurality of script modules based on at least one specified character.

Example embodiments provide that each of the plurality of script modules includes a source code and at least one lazy loading option, and the synchronous script lazy loading further includes splitting each of the plurality of script modules according to the at least one lazy loading option, and storing the at least one lazy loading option in the storage space.

Example embodiments provide that each of the plurality of generated virtual functions include a script module reading function configured to read a corresponding one of the plurality of script modules from the storage space, and load the corresponding one of the plurality of script modules that is read from the storage space into the memory.

Example embodiments provide that the request for initial execution of the desired script module is made when one of the plurality of script modules is initially executed, and the one of the plurality of script modules that is initially executed has a same version as that of the desired script modules.

Example embodiments provide that the synchronous script lazy loading further includes invoking, from among methods contained in the loaded script module, a method that overrides one of the plurality of virtual functions that corresponds to the loaded script module.

Example embodiments provide that a function for performing the synchronous script lazy loading is provided by the network element in response to a request for a web page.

At least one example embodiment relates to a method for synchronous script lazy loading.

According to an example embodiment, a method for synchronous script lazy loading is provided. The method includes generating a plurality of virtual functions, each one of the plurality of virtual functions corresponding to one of a plurality of script modules, loading the plurality of virtual functions into a storage space, and when one of the plurality of virtual functions which corresponds to the desired script module is called for initial execution, loading a desired one of the plurality of script modules from the storage space into the memory, and executing the desired script module from the memory.

Example embodiments provide that the method further includes determining whether a version of the desired script module has a same version as the plurality of script modules stored in the storage space.

Example embodiments provide that the method further includes requesting a script source code which has a same version as a version of at least one of the plurality of script modules that is currently being used, receiving the requested script source code, splitting the received script source code into the plurality of script modules, and storing the plurality of script modules in the storage space.

Example embodiments provide that the splitting of the script source code includes splitting the script source code into each of the plurality of script modules based on at least one specified character.

Example embodiments provide that each of the plurality of script modules includes a source code and at least one lazy loading option, and the splitting of the script source code includes splitting each of the plurality of script modules according to the at least one lazy loading option, and storing the at least one lazy loading option in the storage space.

Example embodiments provide that each of the plurality of virtual function performs a function of reading a corresponding one of the plurality of script modules from the storage space, and loading the corresponding one of the plurality of script modules that is read from the storage space into the memory.

Example embodiments provide that the request for initial execution of the desired script module is made when one of the plurality of script modules is initially executed, and the one of the plurality of script modules that is initially executed has a same version as that of the desired script modules.

Example embodiments provide that the executing of the script module includes invoking, from among methods contained in the loaded script module, a method that overrides one of the plurality of virtual functions that corresponds to the loaded script module.

At least one example embodiment relates to a computer-readable recording medium having recorded thereon a program, which, when executed by a computer, performs a function of synchronous script lazy loading. According to one example embodiment, a non-transitory computer-readable recording medium having recorded thereon a program, which, when executed by a computer, performs a method for synchronous script lazy loading.

At least one example embodiment relates to a client device for performing synchronous script lazy loading.

According to an example embodiment, a client device for performing synchronous script lazy loading is provided. The client device including a synchronous script lazy loader that is configured to generate a plurality of virtual functions. Each one of the plurality of virtual functions corresponds to one of a plurality of script modules. The plurality of script modules may be associated with a script. The processor including a synchronous script lazy loader is configured to load each of the plurality of virtual functions into a storage space. The processor including a synchronous script lazy loader is configured to load a desired one of the plurality of script modules into a memory from the storage space. The processor including a synchronous script lazy loader is configured to execute the desired script module from the memory when a corresponding one of the plurality of virtual functions is requested for initial execution.

At least one example embodiment relates to a method for providing a script for synchronous script lazy loading.

According to an example embodiment, a method for providing a script for synchronous script lazy loading is provided. The method includes extracting a script from source code based on a request for a web page, and providing the script from the transceiver upon a request for the web page. The script being used for synchronous script lazy loading. The synchronous script lazy loading including generating a plurality of virtual functions. Each one of the plurality of virtual functions corresponds to one of a plurality of script modules. The plurality of script modules may be associated with the received script. The synchronous script lazy loading including loading each of the plurality of virtual functions into a storage space. The synchronous script lazy loading including loading a desired one of the plurality of script modules into a memory from the storage space. The synchronous script lazy loading including executing the desired script module from the memory when one of the plurality of virtual functions which corresponds to the desired script module is called for initial execution.

BRIEF DESCRIPTION OF THE DRAWINGS

These and/or other aspects will become apparent and more readily appreciated from the following description of the embodiments, taken in conjunction with the accompanying drawings in which:

FIG. 6 illustrates an example JavaScript source code according to an example embodiment; and FIGS. 7A-7B are tables illustrating differences in loading speed measured in different devices and differences in parsing and execution speeds measured in different web browsers according to whether a synchronous JavaScript lazy loading method according to an example embodiment.

DETAILED DESCRIPTION

Figures 1A, 1B, 1C:
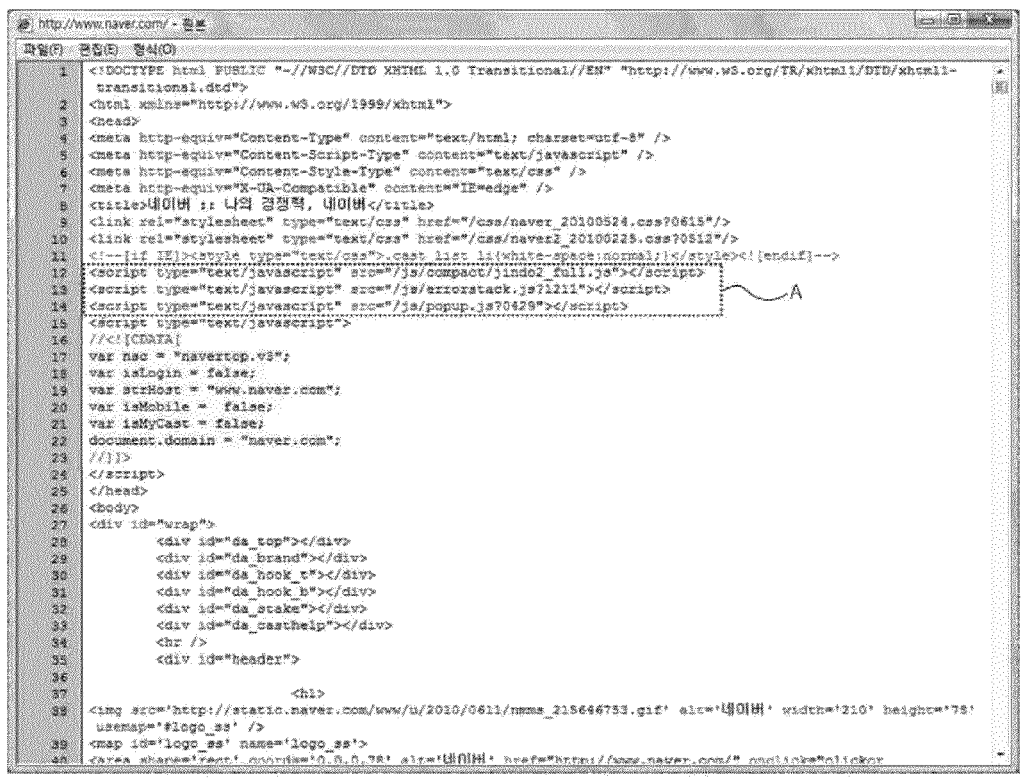
FIG. 1A is a HyperText Markup Language (HTML) source code for a portion of an example HTML file implemented by using a conventional method.
FIG. 1B illustrates an example JavaScript code implemented by using conventional asynchronous JavaScript lazy loading.
FIG. 1C illustrates an example JavaScript code implemented by using synchronous JavaScript lazy loading according to an example embodiment.

Reference will now be made in more detail to the example embodiments, examples of which are illustrated in the accompanying drawings, wherein like reference numerals refer to like elements throughout. The example embodiments are detailed such that a person of ordinary skill in the art to carry out the present invention. It should be understood that various embodiments are different from one another but need not be mutually exclusive. For example, particular shapes, structures, and features described herein with respect to an example embodiment may be used to implement another embodiment without departing from the spirit and scope. It is further to be understood that locations or arrangements of individual components within each of the disclosed embodiments may be changed without departing from the spirit and scope. Therefore, a detailed description which will be described later should be considered in a descriptive sense only and not for purposes of limitation. The scope of the invention, if appropriately described, is defined by the appended claims, along with all the changes or modifications within the scope of the appended claims and their equivalents.

As used herein, the term "script module" or "module" is used in a broad sense and refers to a unit that is defined according to a function to perform one independent function and may include at least one function. Unless otherwise specially stated herein, the "script module" and "module" are used interchangeably to have the same meaning. A script source code is parsed and loaded into a memory for execution. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings so that a person having ordinary skill in the art to which this invention pertains can easily carry out the present invention. While the embodiments are described based on a JavaScript for convenience of explanation, the embodiments thereof are not limited thereto. It will be apparent to one of ordinary skill in the art that any other script language that can be used in a web service may be used instead of JavaScript.

Configuration of the Entire System

Figure 2:
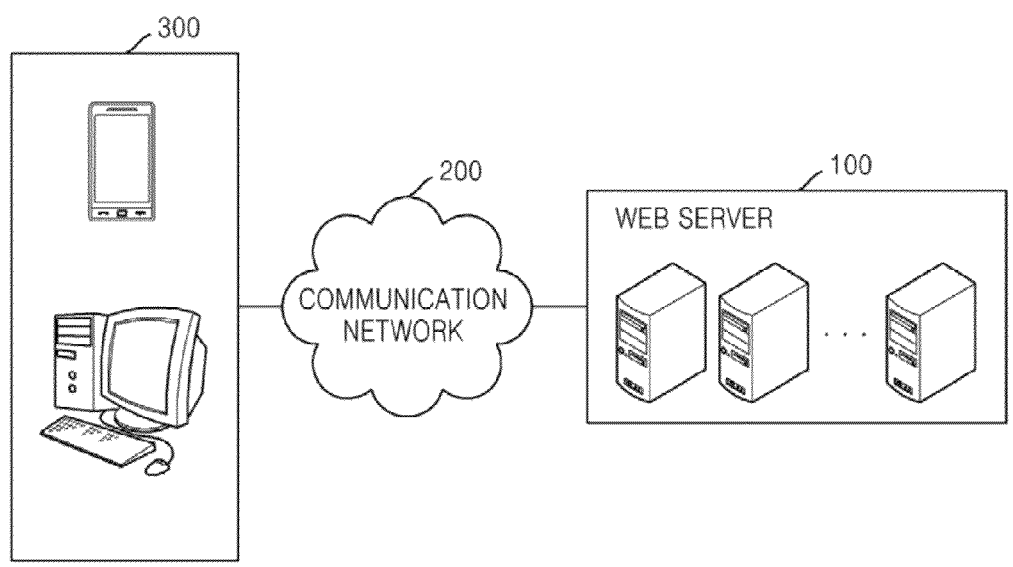
FIG. 2 schematically illustrates a configuration of the entire system for providing a web page including a synchronous JavaScript lazy loading function upon user request, according to an example embodiment.

FIG. 2 schematically illustrates a configuration of the entire system for providing a web page including a synchronous JavaScript lazy loading function upon user request, according to an example embodiment.

Referring to FIG. 2, in the entire system according to example embodiments, a web server 100 including databases is connected to one or more client computers 300 through a communication network 200.

Web server 100 may include a physical computer hardware system that is configured to provide services for client devices (e.g., client computers 300) connected to a network (e.g., communication network 200). Web server 100 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). Web server 100 may be configured to establish, manage, and terminate communications sessions, for example between the web server 100 and one or more of mobile terminals 300. Web server 100 may also be configured to establish, manage, and terminate communications sessions with two or more client devices.

Figure 3:
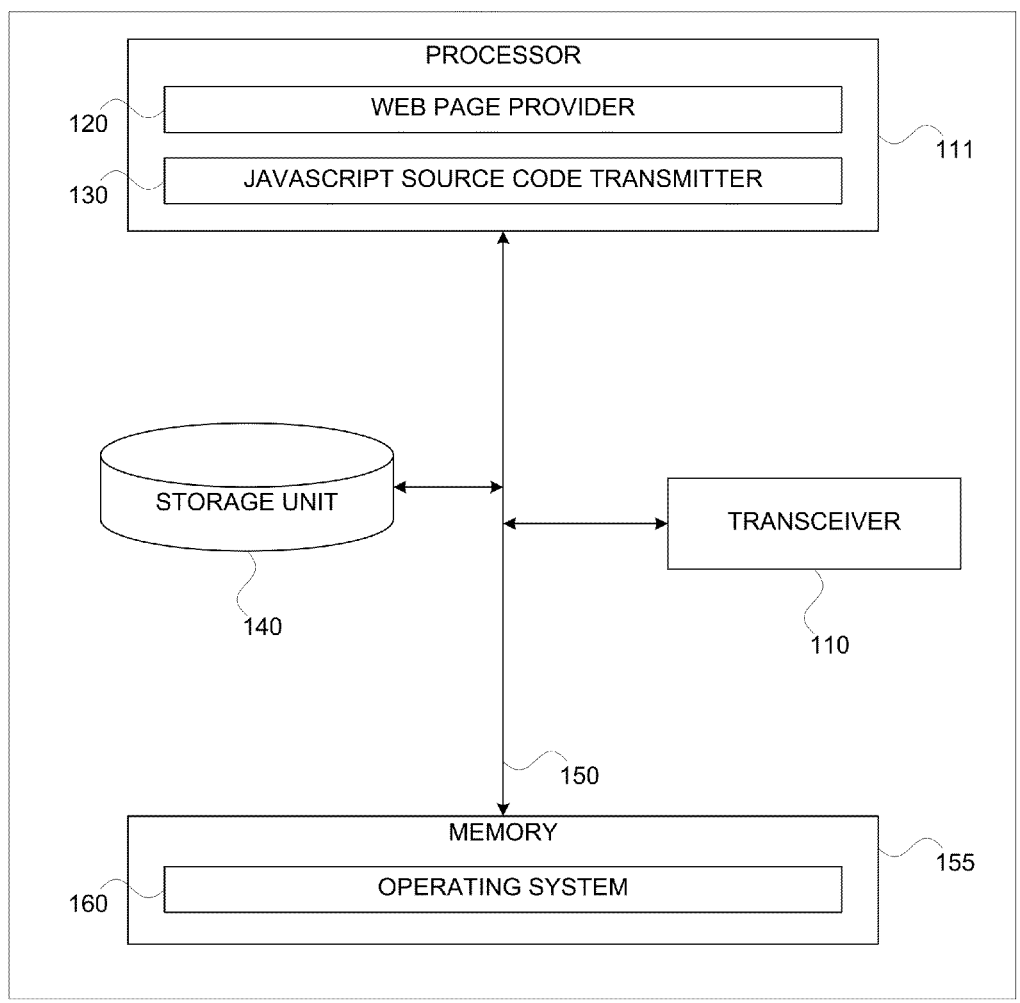
FIG. 3 illustrates a configuration of a web server according to an example embodiment.

According to various embodiments, web server 100 may be connected to, or otherwise associated with one or more databases (e.g., storage unit 140 as shown in FIG. 3).

According to example embodiments, the web server 100 receives a request for transmission of a specific web page from the client computer 300 and fetches the requested web page and transmits the same to the client computer 300. In this case, the request for transmission may be made by inputting a Uniform Resource Locator (URL) address using a web browser. The web page may have a lazy loader for performing synchronous JavaScript lazy loading directly inserted therein, or indirectly include a file stored at a desired (or alternately, "predetermined") location. The lazy loader performs several functions including, inter alia, determining a request for a source code based on whether JavaScript modules stored in the client computer 300 are the same version as that of JavaScript modules used in the web page; receiving source code according to the request and separating the received source code into modules for storage, defining and executing a virtual function for each module and loading the virtual function into a memory, and executing a specific module, upon request for execution of the specific module, by reading a source code of the specific module and loading the source code of the specific module into the memory through execution of a virtual function corresponding to the specific module. Each of the functions of the lazy loader will be described in more detail below.

Furthermore, according to example embodiments, the communication network 200 may include any one of wired and wireless communication networks. For example, the communication network 200 may be composed of various communication networks such as a personal area network (PAN), a local area network (LAN), a metropolitan area network (MAN), a wide area network (WAN), and/or other like communications network. The communication network 200 may also be the World Wide Web (WWW) known in the art or may use a wireless transmission technology used for short-range communication, such as Infrared Data Association (IrDA) or Bluetooth.

According to various embodiments, client computer 300 may be any hardware computing device capable of providing communications services via a cellular network, computer network, and/or other like communications network (e.g., communication network 200). In various embodiments, client computer 300 may be capable of communicating with a server (e.g., web server 100), such that the client computer 300 is able to receive services from the server. Client computer 300 may include memory, one or more processors, and a transceiver. Client computer 300 may be configured to send/receive data to/from network devices, such as a router, switch, or other like network devices. Client computer 300 may be designed to sequentially and automatically carry out a sequence of arithmetic or logical operations; equipped to record/store digital data on a machine readable medium; and transmit and receive digital data via one or more network devices. Client computer 300 may include a wireless transceiver configured to operate in accordance with wireless communications standard. The term "client computer", "mobile terminal", "mobile device", "client device", and the like, as used herein, may refer to any hardware computing device having portability or mobility, such as a smart phone, a laptop computer, a digital broadcasting terminal, video cameras, digital photo cameras, an MP3 player, a tablet PC, a portable medial player (PMP), navigation device, a wearable computing device, and/or any logical device capable of capturing/recording, storing, and/or transferring data via a communications network.

The client computer 300 according to example embodiments is an input/output (I/O) device including a function for connecting to the web server 100 via the communication network 200 in order to receive the result of a user's request for a specific web page. The client computer 300 may be any of digital devices including a memory and a microprocessor for providing computation capability, such as a desktop computer, a notebook computer, a workstation, a palmtop computer, mobile communication devices, e.g., a PDA, a web pad and a smart phone, etc. A web browser may be run or used in such a way as to connect to the web server 100, receive a specific web page with a synchronous lazy loader embedded therein through the web server 100 and display the web page, and synchronously operate a lazy loader.

Configuration of a Web Server

FIG. 3 illustrates a configuration of a web server 100 according to an example embodiment.

Referring to FIG. 3, the web server 100 according to example embodiments includes a transceiver 110, processor 111, storage unit 140, bus 150, and memory 155. During operation, memory 155 includes operating system 160. During operation, processor 111 includes web page provider 120 and JavaScript source code transmitter 130. In some embodiments, web server 100 may include many more components than those shown in FIG. 3. However, it is not necessary that all of these generally conventional components be shown in order to disclose the illustrative embodiment. For example, web server 100 may also include a display, one or more input/out devices, and/or other like components.

Memory 155 may be a computer readable storage medium that generally includes a random access memory (RAM), read only memory (ROM), and a permanent mass storage device, such as a disk drive. Memory 155 also stores operating system 260 and/or other like software components, such as program code for web page provider 120 and JavaScript source code transmitter 130 (not shown). These software components may also be loaded from a separate computer readable storage medium into memory 155 using a drive mechanism (not shown). Such separate computer readable storage medium may include a memory card and/or memory stick, disc, DVD/CD-ROM drive, subscriber identification module (SIM) card, and/or other like computer readable storage medium (not shown). In some embodiments, software components may be loaded into memory 155 via transceiver 110 and/or a network interface (not shown), rather than via a computer readable storage medium.

Bus 150 enables the communication and data transfer between the components of mobile terminal 100. Bus 150 may comprise a high-speed serial bus, parallel bus, storage area network (SAN), and/or other suitable communication technology.

The web server 100 includes a transceiver 110, which may be any device capable of transmitting and receiving radio waves and/or data signals. In various embodiments, the transceiver 110 is a single device including a transmitter and receiver. In other embodiments, the transceiver 110 may include a transmitter and receiver that are logically grouped together as a single unit. Transceiver 110 is a computer hardware component that connects web server 100 to a computer network (e.g., communication network 200) via a wireless connection. In various embodiments, transceiver 110 may be associated with a network interface (not shown) that may provide standardized protocols for web server 100 to connect, disconnect, and/or otherwise communicate with one or more client devices (e.g., client computer 300).

The transceiver 110 receives a request for transmission of a specific web page from the client computer 300, transmits the request to the web page provider 120, receives the web page from the web page provider 120 in response to the transmitted request, and transmits the web page received from the web page provider 120 to the client computer 300. In this case, the request for transmission may be a URL. The transceiver 110 also receives a request for transmission of source codes for JavaScript modules to be lazily loaded from the client computer 300, transmits the request to the JavaScript source code transmitter 130, receives source code from the JavaScript source code transmitter 130 in response to the transmitted request, and transmits the source code received from the JavaScript source code transmitter 130 to the client computer 300. The JavaScript source code may be in the form of a single file including a plurality of JavaScript modules that are separated based on specific characters.

Processor 111 may be configured to carry out instructions of a computer program by performing the basic arithmetical, logical, and input/output operations of the system. Instructions may be provided to processor 111 by memory 155 via bus 150, transceiver 110 via bus 150, or by a network interface (not shown) via bus 150. Processor 111 is configured to execute program code for web page provider 120 and JavaScript source code transmitter 130. Such program code may be stored in a storage device (e.g., memory 155).

The web page provider 120 searches the storage unit 140 for a web page corresponding to a request for transmission received from the transceiver 110. A web page that matches the web page based on the search is transmitted to the transceiver 110 that will in turn transmit the web page to the client computer 300. The web page may include a lazy loader.

The JavaScript source code transmitter 130 extracts a JavaScript source code from the storage unit 140 based on the request for transmission received from the transceiver 110 and transmits the extracted source code to the transceiver 110 for transmission to the client computer 300.

Storage unit 140. In various embodiments, storage unit 140 may be any collection and/or organization of data residing on one or more data storage devices. The one or more data storage devices may be any computer readable medium such as solid state drives, storage area network (SAN) devices, network-attached storage (NAS) devices, local hard drives, optical data disks, magnetic storage, flash memory, and/or other like data storage devices. Furthermore, the storage unit 140 may include one or more virtual machines, such that the physical data storage device(s) containing the storage unit 140 may be logically divided into multiple virtual data storage devices and/or databases. Alternatively, the storage unit 140 may reside on one physical hardware data storage device. In various embodiments, the storage unit 140 may include a database management system ("DBMS"). The storage unit 140 may include a relational database management system ("RDBMS") database. In other embodiments, alternate DBMS may also be used, such as an object database ("ODBMS"), column-oriented DBMS, correlation database DBMS, and the like. In various embodiments, the storage unit 140 may collect and/or store web pages and/or other web page related data for providing one or more web page related services.

In various embodiments, the storage unit 140 includes spaces for storing web pages that can be retrieved by the web page provider 120 and JavaScript source codes that are extracted by the JavaScript source code transmitter 130. Although the web server 100 includes one storage unit 140 for brief illustration, it will be readily apparent to one of ordinary skill in the art that various types of data described above may be stored in one or more database storage units that are physically separated from one other, according to various example embodiments.

The transceiver 110, the web page provider 120, and the JavaScript source code transmitter 130 illustrated in FIG. 3 may be implemented within a single physical device. In various embodiments, some or all of components as shown in FIG. 3 may be implemented in different physical devices. A plurality of physical devices having the same function may also be formed in parallel. In this way, it will be readily apparent to those skilled in the art that the design of the components may be modified in various ways without limitation to the physical number and locations of databases and devices in which each component is installed.

Configuration of a Client Computer

Figure 4:
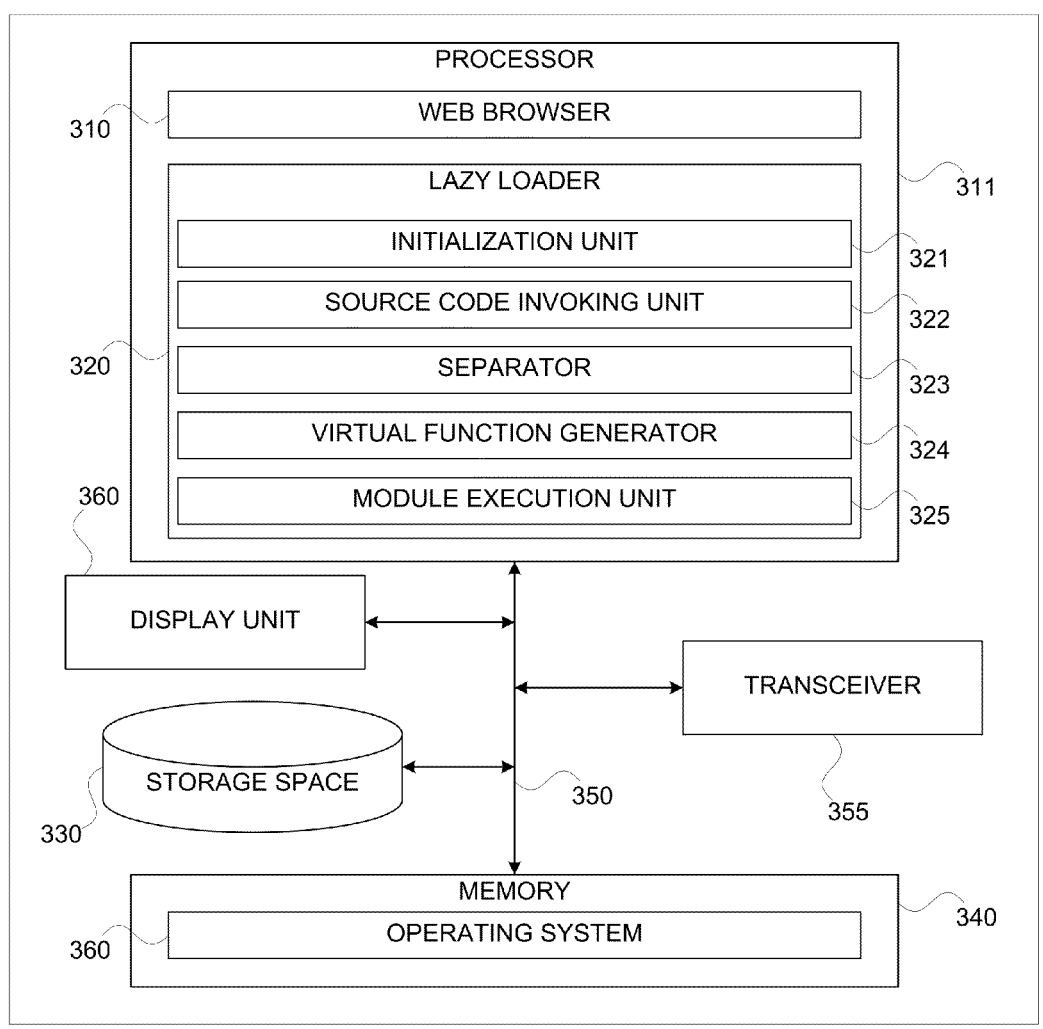
FIG. 4 illustrates a configuration of a client computer for performing synchronous JavaScript lazy loading according to an example embodiment.

FIG. 4 illustrates a detailed configuration of a client computer 300 for performing synchronous JavaScript lazy loading according to an example embodiment. According to example embodiments, through running a lazy loader 320, the client computer 300 implements synchronous lazy loading by loading a stored JavaScript module into a memory when the JavaScript module is requested. A JavaScript code may be selectively received based on a version of the JavaScript code at the time of running of the lazy loader 320 and stored in a storage space 330. Furthermore, functions of the lazy loader 320 according to an embodiment may be included in a web page received according to a request for operation.

Referring to FIG. 4, the client computer 300 according to example embodiments includes processor 311, storage space 330, memory 340, bus 350, transceiver 355, and display unit 360. During operation, memory 340 includes operating system 360. During operation, processor 311 includes a web browser 310 and the lazy loader 320. During operation, lazy loader 320 includes initialization unit 321, source code invoking unit 322, separator 323, virtual function generator 324, and module execution unit 325. In some embodiments, web server 100 may include many more components than those shown in FIG. 4. However, it is not necessary that all of these generally conventional components be shown in order to disclose the illustrative embodiment.

Bus 350 enables the communication and data transfer between the components of mobile terminal 100. Bus 350 may comprise a high-speed serial bus, parallel bus, storage area network (SAN), and/or other suitable communication technology.

Transceiver 355 is any device capable of transmitting and receiving radio waves and/or data signals. In various embodiments, the transceiver 355 is a single device including a transmitter and receiver. In other embodiments, the transceiver 355 may include a transmitter and receiver that are logically grouped together as a single unit. Transceiver 355 is a computer hardware component that connects client computer 300 to a computer network (e.g., communication network 200) via a wired or wireless connection. In various embodiments, transceiver 355 may be associated with a network interface (not shown) that may provide standardized protocols for client computer 300 to connect, disconnect, and/or otherwise communicate with one or more network devices (e.g., web server 100). For example, in various embodiments, the web server 100 may provide the lazy loader 320 to the client computer 300 via the transceiver 355. Once received, the lazy loader 320 may be installed on the client computer 300 and implemented or otherwise operated as discussed below.

Display unit 360 is an output device that presents visual information. The display unit 360 displays data (e.g., web pages and the like) received via the transceiver 355. In various embodiments, the display unit may be a cathode ray tube (CRT) display, a flat panel display device (e.g., a LED display, LCD display, and the like), and/or any other like display device. In various embodiments, where the client computer 300 is a mobile device (e.g., a smartphone, tablet computer, wearable computing device, and the like) the display unit 360 may be a touch screen device that allows a user of the client computer 300 to control the client computer 300 through single and/or multi-touch gestures by touching the display unit 360.

Processor 311 may be configured to carry out instructions of a computer program by performing the basic arithmetical, logical, and input/output operations of the system. Instructions may be provided to processor 311 by storage space 330 via bus 350, transceiver 355 via bus 350, or by a network interface (not shown) via bus 350. Processor 311 is configured to execute program code for web browser 310 and lazy loader 320. Such program code may be stored in a storage device (e.g., storage space 330).

The web browser 310 sequentially interprets and displays (renders) web pages received from the web server 100 via the display unit 360. If the lazy loader 320 is confirmed to be included in the client computer 300 by the web browser 310, the web browser 310 runs or otherwise executes the lazy loader 320. To minimize the time during which the web browser 320 displays a web page, the lazy loader 320 may be run at the time when the web page can be manipulated or after rendering of the web page has been completed. Thus, in a source code of a web page via the display unit 360, a code which when executed, performs the function of the lazy loader 320 may be inserted after an element in the web page that needs to be manipulated or before a </body> tag of the web page. For example, the lazy loader 320 may be run based on an event such as OnLoad, but is not limited thereto. Furthermore, when a request for execution of a specific JavaScript module (i.e., an event for executing the JavaScript module) occurs, the module is lazily loaded synchronously through its corresponding virtual function.

The lazy loader 320 may set a version of a JavaScript source code through initialization, request and receive a JavaScript source code based on a comparison with the set version. In various embodiments, the lazy loader 320 may separate the received source code into JavaScript modules, store the JavaScript modules, and for each JavaScript module, generate a virtual function. The lazy loader 320 may load each of the generated virtual functions into a memory, and perform a synchronous lazy loading function on the JavaScript module by executing the virtual functions according to a request for execution of the JavaScript module.

Memory 340 may be a computer readable storage medium that generally includes a random access memory (RAM), read only memory (ROM), and a permanent mass storage device, such as a disk drive. Memory 340 also stores operating system 360 and/or other like software components, such as program code for web browser 310 and the lazy loader 320. These software components may also be loaded from a separate computer readable storage medium into memory 340 using a drive mechanism (not shown). Such separate computer readable storage medium may include a memory card and/or memory stick, disc, DVD/CD-ROM drive, subscriber identification module (SIM) card, and/or other like computer readable storage medium (not shown). In some embodiments, software components may be loaded into memory 340 via transceiver 355 and/or a network interface (not shown), rather than via a computer readable storage medium.

Storage space 330. In various embodiments, storage space 330 may be any collection and/or organization of data residing on one or more data storage devices. The one or more data storage devices may be any computer readable medium such as solid state drives, storage area network (SAN) devices, network-attached storage (NAS) devices, local hard drives, optical data disks, magnetic storage, flash memory, and/or other like data storage devices. Furthermore, the storage space 330 may include one or more virtual machines, such that the physical data storage device(s) containing the storage space 330 may be logically divided into multiple virtual data storage devices and/or databases. Alternatively, the storage space 330 may reside on one physical hardware data storage device. In various embodiments, the storage space 330 and memory 340 may reside on one physical device. In various embodiments, the storage space 330 may include a database management system ("DBMS"). The storage space 330 may include a relational database management system ("RDBMS") database. In other embodiments, alternate DBMS may also be used, such as an object database ("ODBMS"), column-oriented DBMS, correlation database DBMS, and the like.

In various embodiments, the storage space 330 temporarily and/or permanently storing various types of data that may be generated while the web browser 310 and the lazy loader 320 are running. The storage space 330 may be used as a space for storing JavaScript modules into which a source code received from the lazy loader 320 has been separated. The storage space 330 may be used by utilizing a localStorage specification for storing data on local devices and which is defined by HTML5 specification for a standard programming language HTML used to write a web document.

In detail, referring to FIG. 4, the lazy loader 320 includes an initialization unit 321, a source code invoking unit 322, a separator 323, a virtual function generator 324, and a module execution unit 325.

When the lazy loader 320 is initially run, the initialization unit 321 performs initialization to set a version of JavaScript modules that are used in a current web page. The version of the JavaScript modules may be stored as a specific variable in a web page or the lazy loader 320. The initialization unit 321 also checks whether the JavaScript modules are already stored in the storage space 330 and if the JavaScript modules are stored therein, compares a version of the stored JavaScript modules with the set version of the JavaScript modules that are used in a current web page, and determines whether the versions are the same as each other. Such a determination may be made by comparing the set version of the JavaScript modules with the version of JavaScript modules stored in the storage space 330. If the JavaScript modules are not stored in the storage space 330, or the result of comparison shows that the versions are not the same as each other, the source code invoking unit 322 receives a Java Script source code having the same version as the set version of the JavaScript modules that are used in a current web page, and the separator 323 splits the JavaScript source code into modules for storage.

The source code invoking unit 322 requests a JavaScript source code having the same version as the version set by the initialization unit 321 from the web server 100 and receives a source code provided by the JavaScript source code transmitter 130 in the web server 100. In a general HTML, the entire web page has to be refreshed in order to request specific data from a server side. On the other hand, if Asynchronous Java- Script And XML (AJAX) is used, necessary information may be requested and received from a server side without the need to refresh the entire web page. The JavaScript source code having the same version as the set version may be requested and received by using AJAX, but the source code invoking unit 322 may be implemented using technologies other than AJAX. Since the JavaScript source code may be fetched in a text form, unconditional parsing and loading of JavaScript modules into a memory does not occur as in conventional asynchronous lazy loading. In this case, the separator 323 may split the source code into modules for storage.

The separator 323 splits a JavaScript source code received through the source code invoking unit 322 into JavaScript modules, based on specific characters, and stores the modules in the storage space 330. In various embodiments, each of the JavaScript modules may include a source code and at least one lazy loading option. The JavaScript source code includes special characters inserted between each JavaScript module to be lazily loaded, and the separator 323 splits the JavaScript source code into modules, each module including a source code and a lazy loading option, by using a split( ) function.

Referring to FIG. 6, which illustrates an example JavaScript source code according to an example embodiment, an anonymous function such as "new Function("return defineLazyObject( )")" may be used as specific characters, and the source code of FIG. 6 may be split into two JavaScript modules. Furthermore, a lazy loading option may be set within a character string "defineLazyObject( )" among the defined special characters so that the module may operate differently according to a condition. In detail, the lazy loading option may be set by inserting the type of a module to be lazily loaded (e.g., class type) after a parameter 'sType' within the character string "defineLazyObject( )" and adding methods to be initially invoked in the module after a parameter 'aTriggerMethod', but the present invention is not limited thereto. The virtual function generator 324, as described below, may generate only virtual functions corresponding to the methods set as a lazy loading option, as opposed to generating all virtual functions corresponding to methods within the module. Thus, the separator 323 may also separate lazy loading options for a source code in each module and store them in the storage space 330.

In this way, through initialization, all JavaScript modules used in a web service may be fetched at the same time in a text form if necessary, and the entire JavaScript source code may be separated into modules for storage. By doing so, even if the web browser 310 accesses web pages provided by the web service, it is possible to utilize data stored in the storage space 330 without incurring separate network traffic which would otherwise result due to a request for JavaScript modules. Thus a performance of synchronous lazy loading may be significantly improved.

Furthermore, since data stored in the storage space 330 continues to be retained as long as a user does not intentionally delete the data, if upon comparison between versions, the initialization unit 321 determines a change in a version of JavaScript source code due to release of new features, an existing JavaScript source code may be automatically updated with a JavaScript source code having the latest version. This may facilitate applications and programming by a developer.

The virtual function generator 324 generates virtual functions corresponding to modules stored in the storage space 330 and loads the virtual functions into a memory. A virtual function may contain information about a function included in the corresponding module and may be generated by referring to a lazy loading option set for each of the modules. The virtual function is needed to detect the time at which a specific module is initially executed for synchronous lazy loading. The virtual function may have several functions including loading the module into a memory by reading the module from the storage space 330, transmitting the module to the web browser, and/or invoking again a method that overrides the virtual function among methods contained in the module in order to execute the method. Thus, since the virtual function corresponding to a JavaScript module is very small in size and includes the above-described functions, regardless of the size of the JavaScript module, the virtual function is generated and loaded into memory very quickly. Furthermore, since the virtual function includes common functions as described above, the virtual function may be defined to invoke the module execution unit 325 in the lazy loader 320 as described below while transmitting a parameter used to identify the corresponding module and method, so that the module execution unit 325 loads the corresponding module into a memory and executes the method that overrides the virtual function. The time when a virtual function is called is considered as the time when a specific module corresponding to the virtual function is initially used (i.e., the time when the module is initially executed). In detail, if the initialization unit 321 determines that a specific JavaScript module is not already stored in the storage space 330 or if the JavaScript module is stored but does not have the same version as that of a JavaScript module used in a current web page, the source code invoking unit 322 receives a source code for a JavaScript module having the version of the JavaScript module used in a current web page, and the separator 323 stores the source code. Thereafter, the initial execution of the module occurs when a request for the JavaScript module is initially received.

Upon request for initial execution of a specific JavaScript module, i.e., upon calling of a virtual function that is performed instead of execution of the JavaScript module at the time of initial execution, the module execution unit 325 reads the specific JavaScript module corresponding to the virtual function from the storage space 330 to transmit the JavaScript module to the web browser 310 and loads the JavaScript module into a memory. The module execution unit 325 may also invoke, from among methods included in the JavaScript module, a method that overrides the virtual function in order to execute the method.

In this way, due to execution by the module execution unit 325, the virtual function loaded into the memory may be replaced with a specific module corresponding to the virtual function so that the specific module is loaded into the memory. Thereafter, upon another request for execution of the same specific module, the specific module loaded into the memory may be executed immediately instead of executing the virtual function.

Due to organic functions of the components within the lazy loader 320, each JavaScript module may not be loaded in advance, and at the time of execution of a specific module, only the module may be loaded into the memory synchronously after a virtual function corresponding to the module is executed. Thus, the virtual function of a very small size may be used to prepare execution without the need to load a module currently not being used, and when actual execution of a module is needed, only the module may be loaded into the memory, thereby significantly improving initial loading speed of the web browser 310.

Synchronous JavaScript Lazy Loading Method

Figure 5:
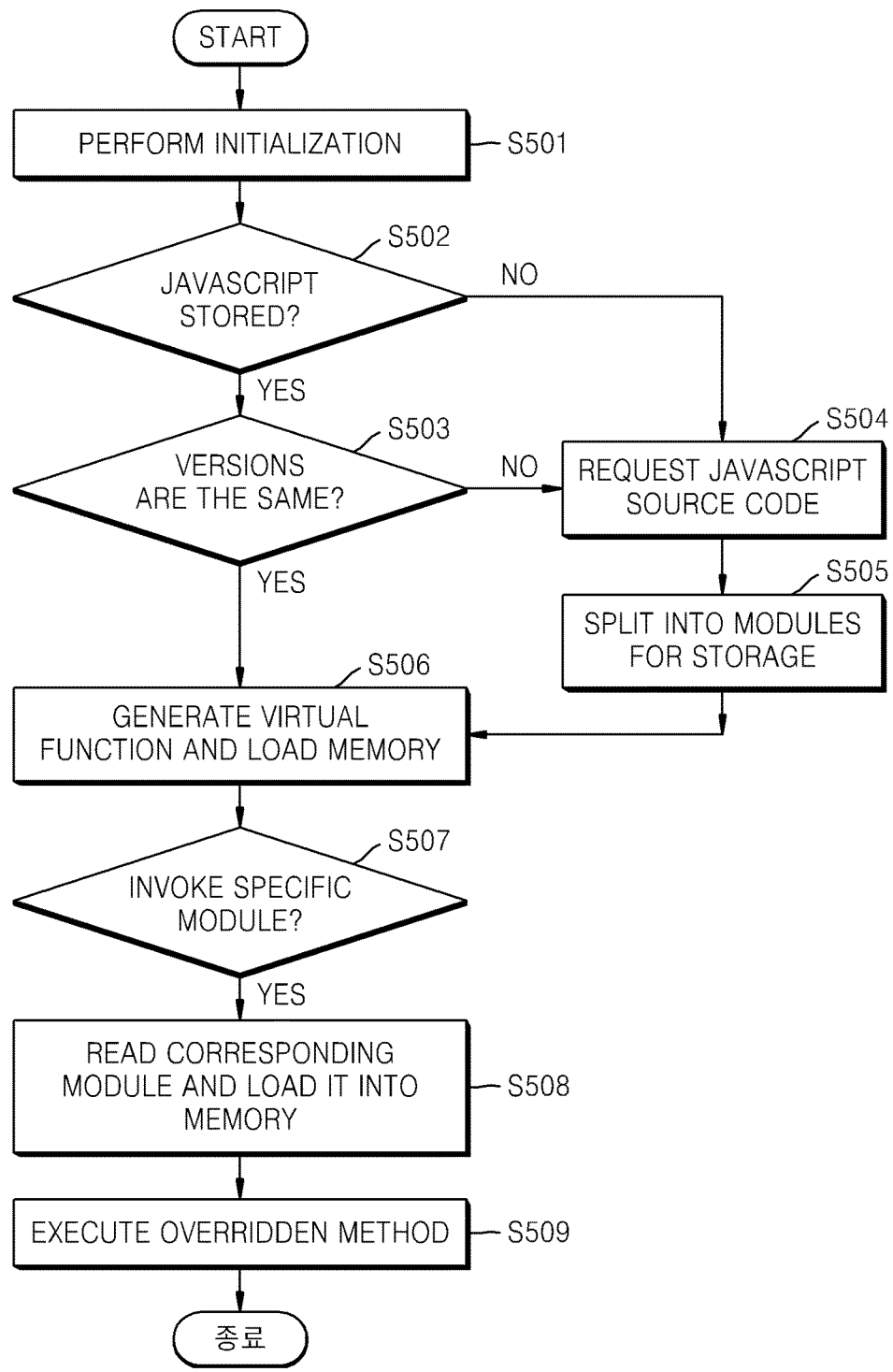
FIG. 5 is a flowchart of a synchronous JavaScript lazy loading method according to an example embodiment.

FIG. 5 is a flowchart of a synchronous JavaScript lazy loading method according to an example embodiment. Referring to FIGS. 4A, 4B, and 5, first, as shown in operation S501, the initialization unit 31 of the lazy loader 320 performs initialization. As described above, the initialization includes setting a version of JavaScript modules that are currently being used in a current web page. As shown in operation S502, the initialization unit 321 then checks whether the JavaScript modules into which a JavaScript source code is separated are currently stored in the storage space 330. If the JavaScript modules are stored, the initialization unit 321 compares the set version with a version of the JavaScript modules stored in the storage space 330 to determine whether the set version and the version of the JavaScript modules are the same as each other as shown in operation S503.

If in operation S502 it is determined that the JavaScript source code is not stored in the storage space 330, or if in operation S503 it is determined that the JavaScript source code is stored but the two versions (i.e., the set version and the version of the JavaScript modules), are not the same as each other, the source code invoking unit 322 requests a JavaScript source code having the set version from the web server 100, as shown in operation S504.

The separator 323 splits the JavaScript source code transmitted according to the request in operation S504 into JavaScript modules. In operation S505, the separator 323 also separates lazy loading options for each of the JavaScript modules and stores the JavaScript modules and the lazy loading options corresponding thereto in the storage space 330. As described above, to separate the JavaScript source code into JavaScript modules, the JavaScript source code may include specific characters for separation. The separator 323 may separate the JavaScript source code into JavaScript modules based on the specific characters.

If the JavaScript source code having the same version as the set version is already stored, or after the JavaScript source code is separated into modules and stored in the storage space 330 in operations S504 and S505 As shown in operation S506, he virtual function generator 324 generates virtual functions corresponding to JavaScript modules stored in the storage space 330 and loads the virtual functions into a memory. A virtual function may be generated based on the lazy loading options separated for each module in operation S505. As described above, the virtual function may include several functions: loading a module corresponding to the virtual function into a memory by reading the module from the storage space 330 and transmitting it to the web browser 310 and invoking again a method that overrides the virtual function among methods contained in the module in order to execute the method. The module execution unit 325 may invoke the method for execution.

Thereafter, upon calling of the virtual function (i.e., upon request for initial execution of a specific JavaScript module) corresponding to the virtual function, in operation S507, the module execution unit 325 reads the specific JavaScript module corresponding to the virtual function from the storage space 330 to transmit the JavaScript module to the web browser 310 and loads the JavaScript module into a memory as shown in operation S508. The module execution unit 325 also invokes, from among methods included in the JavaScript module, a method that overrides the virtual function in order to actually execute the method as shown in S509. Although the synchronous JavaScript lazy loading method of FIG. 5 uses a virtual function, a synchronous JavaScript lazy loading system operates in the same manner as when a function of the lazy loader 320 is not applied. Furthermore, by performing operation S508, the virtual function loaded into the memory is overridden by a specific module corresponding to the virtual function, and upon a subsequent request for execution of the same specific module, the specific module loaded into the memory may be executed immediately without execution of the virtual function.

A synchronous lazy loading method according to an embodiment may perform coding in the same manner as when a conventional lazy loading method is not applied. For example, if a method someMethod within an object util is used, a code may be written similar to the example JavaScript code shown in FIG. 1C implemented by using a synchronous JavaScript lazy loading method according to an embodiment. Thus, a synchronous lazy loading method according to an embodiment allows programming in the same manner as conventional lazy loading without having to consider the execution time of other codes between modules and dependencies between modules, and facilitates application of developed web pages without separate modification thereof.

A difference in loading speed depending on whether a synchronous JavaScript lazy loading method is applied.

FIGS. 7A-7B are tables illustrating differences in loading speed measured in different devices and differences in parsing and execution speeds measured in different web browsers according to whether a synchronous JavaScript lazy loading method according to an example embodiment.

The table illustrated in FIG. 7A illustrates measured loading speed of a specific web page loaded by using different devices having different operating system (OS) versions in a mobile environment that is configured similar to a third generation (3G) network. As evident from the table illustrated in FIG. 7A, when a synchronous JavaScript lazy loading method according to an embodiment is used, loading speed is improved by about 20% to about 25% compared to when the synchronous JavaScript lazy loading method is not applied, regardless of the type of device and OS version.

The table illustrated in FIG. 7B illustrates measurements of time required for parsing and execution of a JavaScript source code upon using different web browsers to load a web page in a single device. As apparent from Table (B), when a synchronous JavaScript lazy loading method according to an embodiment is used, the time required for parsing and execution of the JavaScript source code upon loading a web page is reduced by about 30% compared to when the synchronous JavaScript lazy loading method is not applied, regardless of the type of web browser.

According to the synchronous JavaScript lazy loading method of the present embodiment, since the size of a virtual function generated for each JavaScript module remains small, a difference in loading speed illustrated in FIGS. 7A-7B becomes greater as the size of JavaScript source codes increase in order to implement more functions in a web page.

Synchronous JavaScript lazy loading methods according to the embodiments can be implemented through program instructions that can be executed by various computer means and be recorded on computer-readable recording media. The computer-readable recording media may include individual or a combination of program instructions, data files, and data structures. The program instructions being recorded on the computer-readable recording media can be specially designed or constructed for the present invention or are known to and used by a person skilled in the art of computer software. Examples of the computer readable recording media include magnetic media (e.g., hard disks, floppy disks, magnetic tapes, etc.), optical recording media (e.g., CD-ROMs, or DVDs), magneto-optical media such as floptical disks, and hardware devices specially configured to store and perform program instructions (ROM, RAM, flash memories, etc.). Examples of program instructions include machine language codes produced by a compiler and high-level language codes that can be executed by a computer using an interpreter. The hardware devices can be constructed as one or more software modules in order to perform the operations according to the present invention, and vice versa.

Example embodiments have been described above with respect to method steps illustrating the performance of specified functions and relationships thereof. The boundaries and sequence of these functional building blocks and method steps have been arbitrarily defined herein for convenience of explanation. Alternative boundaries and sequences can be defined so long as the specified functions and relationships are appropriately performed. Any such alternative boundaries or sequences are thus within the scope and spirit of the claimed invention. Further, the boundaries of these functional building blocks have been arbitrarily defined for convenience of explanation. Alternative boundaries could be defined as long as certain significant functions are appropriately performed. Similarly, flow diagram blocks may also have been arbitrarily defined herein to illustrate certain significant functionality. To the extent used, the flow diagram block boundaries and sequences could have been defined otherwise and still perform the certain significant functionality. Such alternative definitions of both functional building blocks and flow diagram blocks and sequences are thus within the scope and spirit of the claimed invention.

The present invention may have also been described, at least in part, in terms of one or more embodiments. An embodiment is used herein to illustrate the present invention, an aspect thereof, a feature thereof, a concept thereof, and/or an example thereof. A physical embodiment of an apparatus, a product of manufacture, a machine, and/or of a process that embodies the present invention may include one or more of the aspects, features, concepts, examples, etc. described with reference to one or more of the embodiments discussed herein. Further, throughout the figures, the embodiments may incorporate the same or similarly named functions, steps, modules, etc. that may use the same or different reference numbers and, as such, the functions, steps, modules, etc. may be the same or similar functions, steps, modules, etc. or different ones.

While one or more example embodiments have been particularly shown and described with reference to specific components, example embodiments, and figures, it should be understood that the example embodiments described therein are provided to aid in the understanding of the invention and not for purposes of limitation. It will also be understood by those of ordinary skill in the art that various changes in form and details may be made therein without departing from the spirit and scope as defined by the following claims.

Therefore, the scope of the invention is defined not by the embodiments but by the appended claims, and all differences within the scope of the appended claims and their equivalents will be construed as being included in the present invention.

What is claimed is:

1. A network device for providing a script for synchronous script lazy loading, the network element comprising:
   a memory having computer readable instructions stored thereon;
   at least one processor configured to execute the computer readable instructions to extract a script from source code based on a request for a web page; and
   a transceiver configured to provide the script from the transceiver upon a request for the web page,
   the script being used with a second processor configured to execute computer readable instructions to perform synchronous script lazy loading, the synchronous script lazy loading including computer readable instructions to
   split the extracted script source code into a plurality of script modules,
   generate a plurality of virtual functions, each one of the plurality of virtual functions corresponding to one of the plurality of script modules, the plurality of script modules being associated with the script,
   load each of the plurality of virtual functions into the memory,
   load a desired one of the plurality of script modules into the memory from a storage space when a corresponding one of the plurality of virtual functions is requested for initial execution, and
   execute the desired script module from the memory.

2. The network device of claim 1, wherein the script lazy loading further includes computer readable instructions to:
   determine whether a version of the desired script module has a same version as the plurality of script modules stored in the storage space.

3. The network device of claim 1, wherein the script lazy loading further includes computer readable instructions to:
   receive a script source code according to a request for the script source code, the script source code having a same version as a version of at least one of the plurality of script modules currently being used;
   split the script source code into the plurality of script modules; and
   store the plurality of script modules in the storage space.

4. The network clement device of claim 3, wherein the script lazy loading further includes computer readable instructions to:
   split the script source code into the plurality of script modules based on at least one specified character.

5. The network device of claim 3, wherein each of the plurality of script modules includes a source code and at least one lazy loading option, and the script lazy loading further includes computer readable instructions to:
   split each of the plurality of script modules according to the at least one lazy loading option; and
   store the at least one lazy loading option in the storage space.

6. The network device of claim 1, wherein each of the plurality of generated virtual functions comprise:
   a script module reading function configured to,
      read a corresponding one of the plurality of script modules from the storage space, and
      load the corresponding one of the plurality of script modules into the memory.

7. The network device of claim 1, wherein the request for initial execution of the desired script module is made when one of the plurality of script modules is initially executed, and the one of the plurality of script modules that is initially executed has a same version as that of the desired script modules.

8. The network device of claim 6, wherein the script lazy loading further includes computer readable instructions to:
   invoke, from among methods contained in the loaded script module, a method that overrides one of the plurality of virtual functions that corresponds to the loaded script module.

9. The network device of claim 1, wherein a function for performing the script lazy loading is provided by the network element in response to a request for a web page.

10. A method for synchronous script lazy loading, the method comprising:
    splitting, by a processor, script source code into a plurality of script modules generating, by the processor, a plurality of virtual functions, each one of the plurality of virtual functions corresponding to one of the plurality of script modules;

loading, by the processor, the plurality of virtual functions into a memory; and when one of the plurality of virtual functions which corresponds to the desired script module is called for initial execution, loading, by the processor, a desired one of the plurality of script modules from a storage space into the memory, and executing, by the processor, the desired script module from the memory.

11. The method of claim 10, further comprising:
determining whether a version of the desired script module has a same version as the plurality of script modules stored in the storage space.

12. The method of claim 10, further comprising:
requesting a script source code which has a same version as a version of at least one of the plurality of script modules that is currently being used;
receiving the requested script source code;
splitting the received script source code into the plurality of script modules; and
storing the plurality of script modules in the storage space.

13. The method of claim 12, wherein the splitting of the script source comprises:
splitting the script source code into each of the plurality of script modules based on at least one specified character.

14. The method of claim 12, wherein each of the plurality of script modules includes a source code and at least one lazy loading option, and the splitting of the script source code comprises:
splitting each of the plurality of script modules according to the at least one lazy loading option; and
storing the at least one lazy loading option in the storage space.

15. The method of claim 10, wherein each of the plurality of virtual function performs a function of:
reading a corresponding one of the plurality of script modules from the storage space; and
loading the corresponding one of the plurality of script modules into the memory.

16. The method of claim 10, wherein the request for initial execution of the desired script module is made when one of the plurality of script modules is initially executed, and the one of the plurality of script modules that is initially executed has a same version as that of the desired script modules.

17. The method of claim 15, wherein the executing of the script module comprises:

invoking, from among methods contained in the loaded script module, a method that overrides one of the plurality of virtual functions that corresponds to the loaded script module.

18. A non-transitory computer-readable recording medium having recorded thereon program code, that when executed by a processor, performs a function according to the method of claim 10.

19. A client device for performing synchronous script lazy loading, the client device comprising:
a memory having computer readable instructions stored thereon;
at least one processor configured to execute the computer readable instructions to,
split source code of a received script into a plurality of script modules,
generate a plurality of virtual functions, each one of the plurality of virtual functions corresponding to one of the plurality of script modules, the plurality of script modules being associated with the received script, and load each of the plurality of virtual functions into the memory, and
load a desired one of the plurality of script modules into the memory from a storage space when a corresponding one of the plurality of virtual functions is requested for initial execution, and
execute the desired script module from the memory.

20. A method for providing a script for synchronous script lazy loading, the method comprising:
extracting, by a processor, a script from source code based on a request for a web page; and
providing, by the processor, the script from the transceiver upon a request for the web page,
the script being for synchronous script lazy loading, the synchronous script lazy loading including,
splitting the extracted script source code into a plurality of script modules,
generating a plurality of virtual functions, each one of the plurality of virtual functions corresponding to one of the plurality of script modules, the plurality of script modules being associated with the received script, loading each of the plurality of virtual functions into a memory,
loading a desired one of the plurality of script modules into the memory from a storage space when a corresponding one of the plurality of virtual functions is requested for initial execution, and executing the desired script module from the memory.

* * * * *